United States Patent [19]

Greene

[11] Patent Number: 5,281,309

[45] Date of Patent: Jan. 25, 1994

[54] PORTABLE WATER PURIFICATION SYSTEM

[75] Inventor: Ralph G. Greene, Dalton, Ga.

[73] Assignee: Market Design & Development, Inc., Dalton, Ga.

[21] Appl. No.: 902,703

[22] Filed: Jun. 23, 1992

[51] Int. Cl.[5] ............................................. B01D 3/02
[52] U.S. Cl. ................................ 202/181; 202/185.3; 202/200; 202/202; 202/206; 203/4; 203/10; 203/DIG. 16; 203/DIG. 18; 203/1; 222/67; 392/325
[58] Field of Search ............... 202/181, 206, 200, 197, 202/185.3, 202; 203/1, 10, 4, 40, DIG. 16, DIG. 18; 392/325, 318, 319; 137/395; 222/67

[56] References Cited

U.S. PATENT DOCUMENTS

| 851,045 | 4/1907 | Ullrick | 202/181 |
|---|---|---|---|
| 879,236 | 2/1908 | Bartholomew | 202/181 |
| 1,252,154 | 1/1918 | Nenninger | 202/181 |
| 3,207,282 | 9/1965 | Norris, Jr. | 203/10 |
| 3,236,746 | 2/1966 | Poindexter et al. | 202/185.3 |
| 3,513,076 | 5/1970 | Lowell | 203/10 |
| 3,572,553 | 3/1971 | Ogden | 222/185 |
| 3,653,413 | 4/1972 | Sheya | 222/383 |
| 3,687,817 | 8/1972 | Jimerson et al. | 202/181 |
| 3,696,003 | 10/1972 | Fitch et al. | 202/181 |
| 3,825,491 | 7/1974 | Sanchez | 202/181 |
| 4,017,006 | 4/1977 | Wilder | 222/67 |
| 4,200,496 | 4/1980 | Stein | 202/181 |
| 4,601,789 | 7/1986 | Bjorklund | 202/181 |
| 4,690,102 | 9/1987 | Sundquist | 122/16 |
| 4,906,337 | 3/1990 | Palmer | 202/160 |
| 5,111,966 | 5/1992 | Fridman | 222/67 |
| 5,114,042 | 5/1992 | Sutera | 222/67 |

FOREIGN PATENT DOCUMENTS

0768138  2/1957  United Kingdom ............... 202/181

Primary Examiner—Virginia Manoharan
Attorney, Agent, or Firm—Alan Ruderman

[57] ABSTRACT

A water purification device mounted within a housing adapted to be positioned on an existing water cooler/dispenser has a valve control member extending from the base of the housing and is positionable within the water reservoir of the dispenser to control the release of purified water from the device to the reservoir. The device includes a feedwater tank into which supply water is fed, either automatically, or manually. The feedwater tank, when the water is above a minimal level, feeds water to an anti-backflow control housing which communicates the water from the feedwater tank to the bottom of a boiler which is maintained at the same level as the water in the feedwater tank without the use of a float within the boiler. The anti-backflow housing includes a check valve in the form of a ball that prevents the backflow of heated water from the boiler into the feedwater tank. The boiler is connected to condenser coils for condensing vaporized water from the boiler to form distilled water which is directed through a carbon filter to a distillate storage tank where the purified water is stored until required by the water cooler/dispenser. Controls are provided for the device.

15 Claims, 3 Drawing Sheets

PORTABLE WATER PURIFICATION SYSTEM

BACKGROUND OF THE INVENTION

This invention generally relates to a portable water purifier for purifying and storing drinking water, and more particularly to a purifier positionable on an existing conventional water cooling and dispensing unit.

Concern over drinking water purity and taste have prompted alternative sources of supply other than that supplied by processed tap water. This concern has been fueled by widely publicized reports of water pollution and by tap water often containing large amounts of water treatment chemicals, minerals and other matter.

One attempt to deal with this problem is the increased use of bottled waters. Sales of bottled waters which have increased substantially in recent years generally consists of a single serving to a one gallon container sold in retail establishments, and of larger containers, e.g., 5 gallon containers, sold for use with water cooler dispensers. Bottled cool water dispensers are extremely popular for both residential and commercial use because cold drinking water may be dispensed from generally a three to five gallon bottle without the need for plumbing. However, such bottled waters are expensive, and changing and storing large heavy and cumbersome bottles is burdensome.

Several problems with the quality of bottled waters also have been discovered and publicized recently. At the present time, bottled waters are not subject to the same governmental regulation and scrutiny as tap water. Under these circumstances, the consumer can never be sure of the source or quality of the purchased water. Actually, some bottled waters are merely bottled tap water. Even bottled water from other sources is subject to contamination from the source, during processing, or from the bottle itself.

Bottled waters can readily become contaminated by airborne bacteria and viruses during the dispensing operation by the introduction of ambient air drawn inside the bottle as the water is dispensed. Further, the stagnant storage of bottled water allows bacteria to grow unchecked. A recent study has shown counts as high as 300,000 bacteria per milliliter from some bottled water. Discoveries of dangerous chemicals and extremely high levels of bacteria in bottled waters has led many to the conclusion that bottled water may be no more pure, or sometimes even less pure, than ordinary tap water. Such problems with tap and bottled water have revealed a need and desire for water treatment at the point of use.

Several point of use treatment alternatives exist to tap and bottled water and are well known in the art. One such alternative is the use of carbon filtration. Carbon filters use activated charcoal to remove impurities consisting mostly of organic compounds and to improve the taste of water. Carbon filters, however, are generally ineffective in removing most inorganic compounds such as lead and arsenic.

Another alternative known in the art is the use of reverse osmosis to treat the water. Reverse osmosis units use a sediment prefilter. These units however, have a tendency to become clogged by high levels of hardness minerals and thus are not feasible for some geographic locations. Other problems with reverse osmosis include the waste of approximately 80% of the feedwater, the great expense of replacement membranes and the requirement of pressurized water feed lines and water drain lines which eliminates portability.

Another alternative point of use water treatment method is distillation. Distillation devices purify water by boiling water to generate steam, and then condense the steam to form water free from such contaminants. The contaminants having a vaporization temperature higher than that of water remain in the boiling pot, while solvents which have a boiling point lower than water may be separated from the steam by venting before condensation. The distillation process is more effective in removing impurities than reverse osmosis and does not have the problem of water waste.

Distillation devices may be portable, without the need for pressurized feed lines and drain lines or non-portable which require feed lines to supply water. Distillation alone, however, is relatively ineffective in removing volatile chemicals such as benzene and chlorine.

Existing portable distillers and most non-portable devices have failed to adequately deal with the problem of scale deposits in, and cleaning of, the boiling pot, as for example, the portable distillation device shown in U.S. Pat. No. 4,342,623 which has no provision to inhibit scale build-up. Other prior art portable distillation devices have a removable boiling pot, but require partial disassembly of the unit for removal of the boiling pot. Additionally, the known distillation units include a float valve within the boiling pot or tank, such as U.S. Pat. No. 4,943,353 which is thus exposed to the build-up of scale. When excessive scale deposits occur failure of the float valve may result which may cause an overheating situation and a system failure.

Distillation units in the prior art are of the type wherein the water is distilled and captured for subsequent use, such as illustrated in U.S. Pat. No. 4,342,623; of the type wherein uncooled water may be dispensed as illustrated in U.S. Pat. No. 4,622,102; or of the type wherein the distillation unit is coupled with refrigeration such as illustrated in U.S. Pat. No. 3,055,810. As aforesaid, bottled water dispensers are extremely popular. It would thus be advantageous to replace the water bottles of such containers with a less expensive and purer water source such as an efficient distillation unit.

SUMMARY OF THE INVENTION

Consequently, it is a primary object of the present invention to provide water purification apparatus that may be readily mounted on a water cooler dispensing unit to replace bottled water for point of use purification of drinking water.

It is another object of the present invention to provide a water distillation and purification unit having a boiling pot in which the water level is controlled by the water level in the feedwater supply tank so that there are no elements within the boiling pot exposed to mineral deposits.

It is another object of the present invention to provide a water distillation and purification device positionable on a conventional water cooler dispenser, the device having a valve control member positionable within the water reservoir of the dispenser for shutting the flow of purified distilled water from the device to the dispenser when the desired capacity of the reservoir has been attained.

Accordingly, the present invention provides water distillation and purification apparatus mounted within a housing adapted to be positioned on a conventional water cooler dispenser, the apparatus having a valve control member extending from the housing and positionable within the water reservoir of the dispenser to control the release of purified water from the apparatus to the reservoir. The apparatus includes a feedwater tank into which supply water is fed, either automatically when connected to plumbing, or manually in a batch feed mode, the feedwater tank, when the water is above a minimal predetermined level therein, feeding water to an anti-backflow control housing. The anti-backflow housing communicates the raw water from the feedwater tank to the bottom of the evaporator or boiler which is thereby maintained at a water level equal to or less than that in the feedwater tank without the use of a float or the like within the boiler.

The anti-backflow housing includes a float check valve that prevents the backflow of heated water from the boiler into the feedwater tank. The anti-backflow housing additionally provides a volatile gas vent for the gases in the heated water that returns from the boiler. The boiler is connected to air cooled condenser coils so that the water which vaporizes within the boiler may flow to the condenser and condense to form distilled water therein, the air heated by the condenser coils also acting to preheat the feedwater in the feedwater tank. The distilled water is directed through a carbon filter to a distillate storage tank where the purified water is stored until required by thecooler/dispenser on which the apparatus is disposed.

Controls are provided for the apparatus so that the boiler may only be operable during certain times, and then only when the water in the boiler is above a preselected level and the water in the distillate storage tank is below a preselected level, the boiler being shut down when the level of water in the distillate storage tank reaches a predetermined level.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 3:
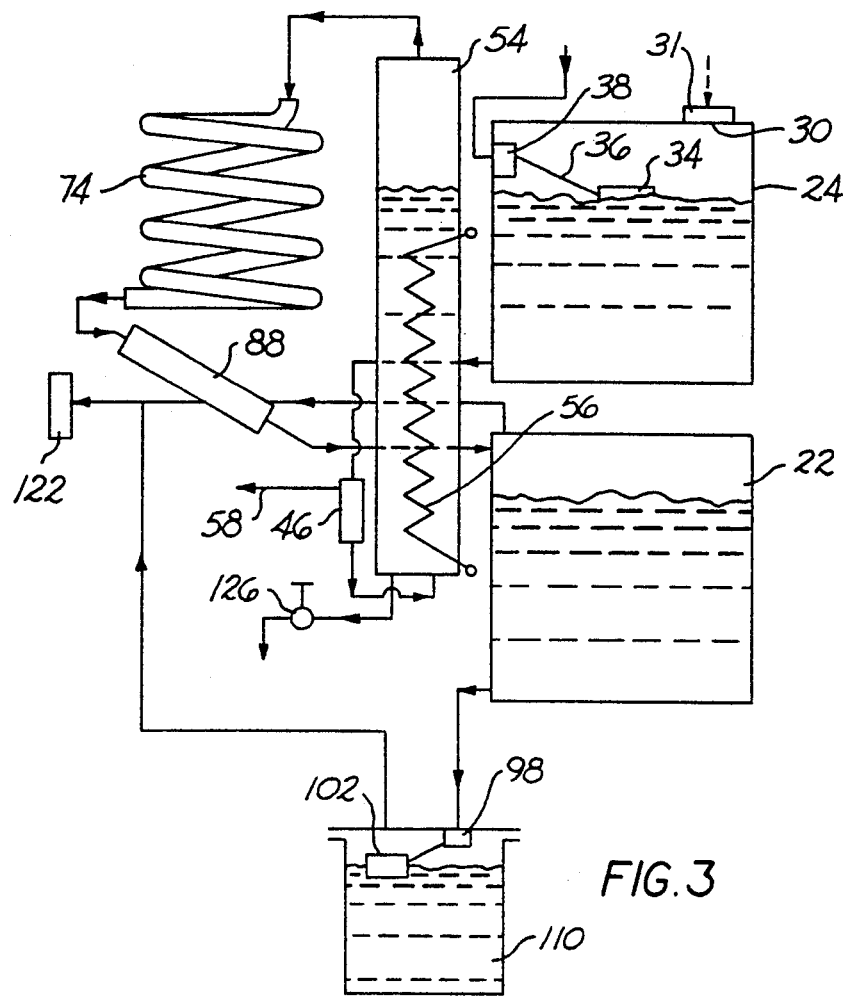
FIG. 3 is a diagrammatic view of the water distillation and purification system of the present invention.

Referring to the drawings a water distillation and purification device 10 constructed in accordance with the principles of the present invention comprises a housing 12 preferably having a substantially rectangular configuration including a base 14 and a plurality of upstanding walls 16, 18, 20 respectively forming a portion of the front and rear walls and a side wall of the housing. Mounted on the base 14 is a distillate or distilled water tank 22, the tank having a height approximately half of that of the upstanding walls. A feedwater tank 24 is mounted on the top of the distilled water or distillate tank 22 and has its top substantially coplanar with the upper edges of the upstanding walls 16, 18, 20 so that a vented cover (not illustrated) may be positioned thereon. The tanks 22 and 24 abut upstanding interior walls 26, 28 extending inwardly from the front and rear walls 16, 18 respectively. As illustrated exterior surfaces of the tanks 22, 24 are coplanar with the walls 16 and 18 to form the remaining portions of the front and rear walls of the housing 12 and also the side remote from the side wall 20. As illustrated in FIG. 3 the feedwater tank 24 may have an opening 30 in its top, normally closed by a fill cap 31, the tank in this case being batch filled with water normally through the opening. Alternatively, the apparatus may be made automatic by connection into plumbing at the location where used, the plumbing being connected to an inlet connector 32 in the side wall 20.

Mounted within the feedwater tank 24 for those units which are to be automatically filled is a float 34, the float being part of a float valve assembly which includes an arm 36 extending from the float to a valve member 38 connected through tubing 40 extending out of the feedwater tank to the inlet connector 32. Thus, when the level of water in the tank 24 reaches a predetermined desired amount, the valve member 38 is actuated to shut the flow of water from the tubing 40 to the tank. Communicating with the feedwater tank 24 to a fitting 42 adjacent the bottom of the tank is a tube 44 which at the end remote from the fitting extends into a small housing 46. The housing 46 has a substantially cylindrical configuration and a ball having a diameter slightly less than that of the inside diameter of the housing is disposed within the housing. The ball 48 is constructed so as to float on water within the housing, and preferably is a hollow metal ball. As illustrated, the end of the tube 44 is within the housing 46, as illustrated at 50, and when the water level within the housing 46 is sufficient to engage the ball against the end of the tube, water within the housing 46 is precluded from returning into the tank 24. Thus, heated water from the boiler, as hereinafter explained, is precluded from flowing back from the housing 46 to the feedwater tank 24, and the assembly acts as an anti-backflow assembly, but water may flow from the feedwater tank through the tube 44 into the housing 46 since the water pressure in the feedwater tank is greater than the water pressure in the anti-backflow housing.

One end of an outlet tube 52 is connected to the anti-backflow housing 46 adjacent the bottom thereof, while the other end of the tube 52 is connected to a boiler or evaporator 54 adjacent the lower end thereof. The boiler is an elongated preferably cylindrical housing and includes an electrical heating coil 56, illustrated in FIGS. 3 and 4 mounted therein at the lower end of the boiler for heating water within the boiler to the boiling point as hereinafter further described. Extending upwardly from the top of the anti-backflow housing 46 is one end of a vent tube 58, the other end of the tube 58 is above and preferably being bent away from the feedwater tank and directed outside the housing 12. Thus, any heated water that flows back from the boiler 54 is precluded from flowing into the feedwater tank and the volatile gases in the heated water that flows back into the anti-backflow housing 46 is vented through the tube 58 to atmosphere.

Figure 4:
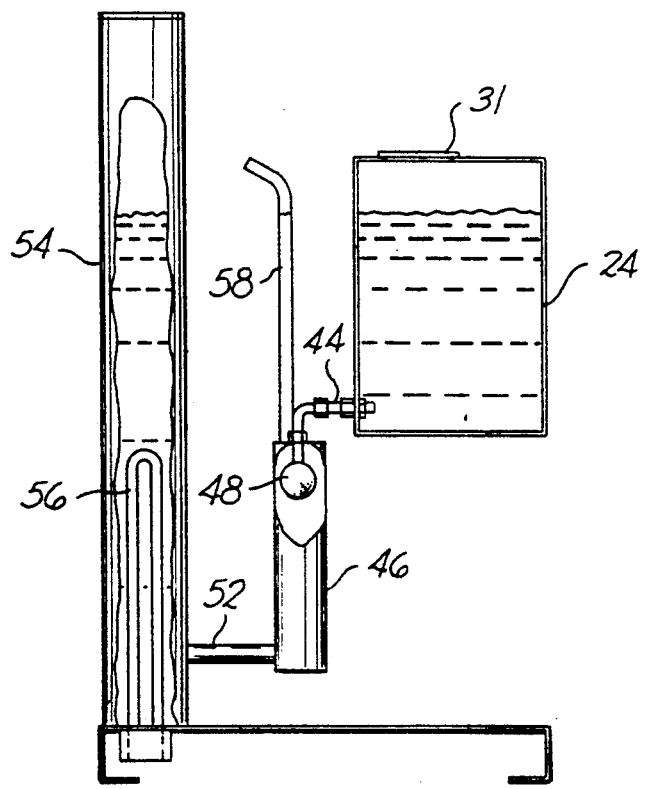
FIG. 4 is an elevational view illustrating the water level control within the boiler and the anti-backflow control of the heated water.

As illustrated in FIG. 4 the water level within the boiler 54 is controlled by the level of the water in the feedwater tank 24. This is effected by communicating the boiler directly with the feedwater tank, the anti-backflow housing merely acting as a conduit for the flow of water from the tank 24 to the boiler. By disposing the feedwater tank such that with sufficient water therein the level is always above the top of the heating coil 56 so that the boiler will not boil dry. This is readily effected by mounting the feedwater tank 24 at a higher elevation within the housing 12 than the top of the heating element 56 and providing sufficient water to the feedwater tank. In this manner the mounting of float valves or other controls within the boiler is avoided and thus there are no control elements within the boiler which could fail due to accumulation of mineral deposits thereon, and the level control system is fail-safe. Additionally, as clearly illustrated in FIG. 4, the water pressure within the feed water tank is always greater than the water pressure within the tank 46 so that water from the tank 24 can always flow into the housing 46 and enter the boiler, although heated water which may backflow from the boiler into the anti-backflow housing 46 is precluded from flowing into the feedwater tank by the action of the ball 48. The water level within the feedwater tank 24 effects a rising of the water within the housing 46 and the water enters the vent 58. However, the vent tube 58 extends above the top of the feedwater tank so that only gases but not water can exit the free end of the vent tube.

The boiler 54 is constructed from a non-corrosive material such as stainless steel and is covered about the major vertical portion thereof externally by insulation 60 held thereon by clamps 62. The upper end of the boiler has a removable cap 64 held tight in sealing engagement with a gasket 66 about the upper end of the boiler by a pair of coil springs 68 connected between the cap and the exterior wall of the boiler above the insulation. The cap is thus liftable off of the boiler so that maintenance may be performed within the boiler. A U-shape tube 70 has one end secured to the cap 64 and its other end connected through an elbow to a tube 72 which is connected to the inlet end of a condenser coil 74. The condenser is coiled about an air flow circulation globe 76 disposed in spaced relationship thereto so that air may flow between the coils and the globe, the coils and globe being mounted on one or more brackets 78 extending across the housing 12. Disposed beneath the coils 74 on another mounting bracket 80 carried by the bracket 78 is a fan 82 and fan motor 84 which supplies cooling air upwardly between the coils 74 and globe 76 to condense the steam flowing through the coils into distilled water. Additionally any cooling air escaping about the coils merely acts to preheat the water in the feedwater tank.

Figure 2:
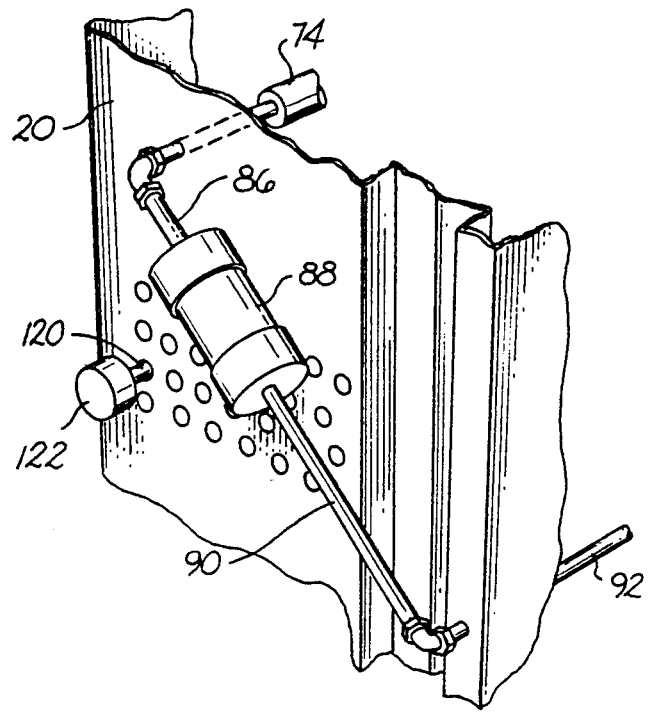
FIG. 2 is a fragmentary rear perspective view of a portion of the apparatus of FIG. 1.

As illustrated in FIG. 2, the distilled water exiting from the condenser flows out of the apparatus through tubing 86 into a carbon or activated charcoal filter 88 where the distilled water is further purified of any remaining organic compounds and where the normally flat taste of distilled water is substantially improved. The filter 88 is on the exterior of the distillation apparatus so that replacement may readily occur without disassembly of the apparatus. The distilled and purified water thereafter may flow through the filter 88 through tubing 90 and back into the apparatus through other tubing 92 which opens into the distillation storage tank 22.

Figure 5:
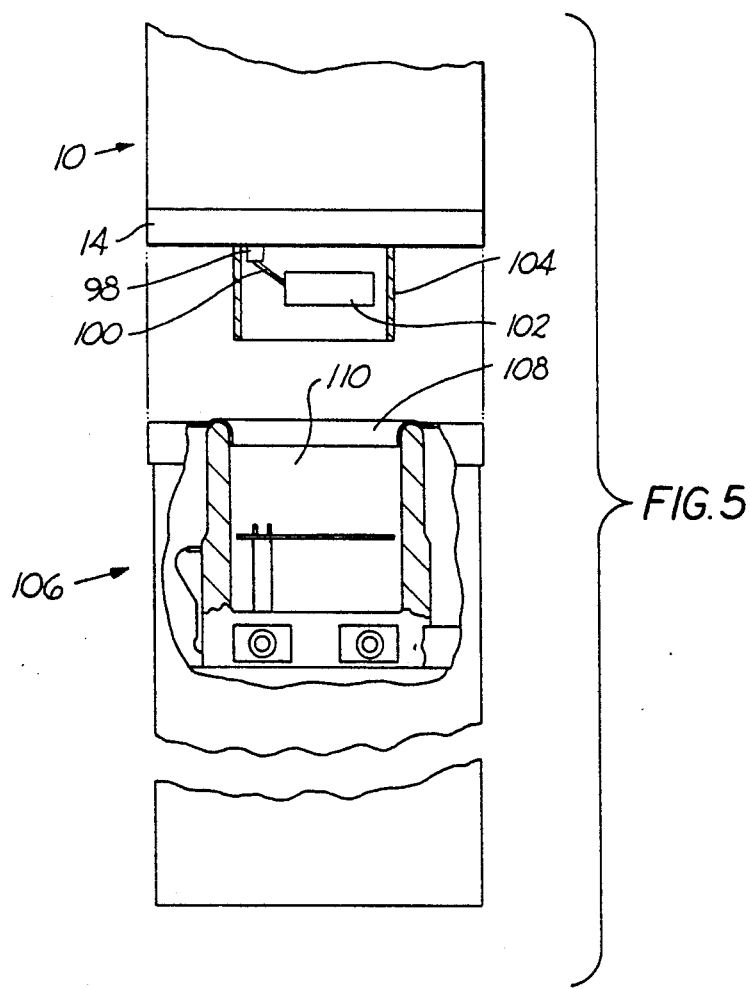
FIG. 5 is a fragmentary elevational view with parts thereof broken away and in section illustrating the mounting of the apparatus of FIG. 1 on a conventional water cooler and dispenser.

Mounted in the inner wall 28 of the housing 12 and extending into the distillate tank 22 adjacent the bottom thereof is a fitting 94 communicating the interior of the tank 22 with one end of a tube 96 disposed externally of the tank, the other end of the tube being connected to a float control valve member 98. The valve member is part of an assembly which includes an arm 100 connecting a float 102 to the valve member. When the float is raised to a predetermined position the valve is closed and the flow of water from within the tank 22 through the tube to the valve is shut. Disposed about the valve 98, the arm 100 and the float 102 and extending downwardly from the apparatus below the base 14 is an annular guard 104. Thus, as illustrated in FIG. 5, the water purification device 10 may be positioned upon a conventional bottled water cooling and dispensing unit 106 when the water bottle is removed, and the guard 104 is received within the top cabinet ring 108 of the unit 104 with the float 102 disposed within the water plenum 110 of the unit. The water level within the plenum 110 of the cooler and dispensing unit thus effects the operation of the valve 98 and the flow of water from the tank 22 to the cooler and dispensing unit 106.

Disposed within the wall 28 and extending into an upper portion of the distillation tank 22 is another fitting 112 which is connected to one end of a tube 114. The other end of the tube 114 communicates with one leg of a Y-connector 116 having a downwardly extending tube 118 connected to another leg, the tube 118 extending through the base and opening within the interior of the guard 104. The third leg of the connector 116 communicates with a tube 120 which, as illustrated in FIG. 2, extends out the wall 20 where it is connected to an air filter 122 which traps air-borne bacteria.

A drain is provided for the boiler 54 by connecting the lower end of the boiler to one end of a flexible tube 124 which is guided between the pinch valve 126 of a pinch valve assembly, the pinch valve being controlled by a threaded knob 128 which extends through the wall 18 so as to be manually adjustable from outside the water purification unit. When maintenance of the boiler is required, as for example when the boiler is cleaned with cleaning fluids and then flushed, the valve 126 may be opened to drain the fluid and flushing water from the boiler.

Mounted in the wall 26 and extending into the feedwater tank 24 at a selected disposition to provide a low level signal is a level float switch 130, while a similar switch 132 extends through the wall 26 into the distillate tank 22 at an upper disposition therein. The switch 130 provides a low level stop to prevent the boiler from operating when the water level within the feedwater tank 24 is below the selected level so that the feedwater tank and thus the boiler is sufficiently full, while the switch 132 provides a high level stop to prevent operation of the boiler when the water level within the distillate tank 22 reaches a predetermined stop level. Thus, overheating of the boiler is precluded through the switch 130 while energy waste is minimized through the switch 132. The apparatus also includes a 24 hour timer 134 mounted on the front for selecting the times within which the boiler may operate, such as at night in the summer to reduce the heat load in the room in which the purification apparatus is located. The apparatus also includes a thermostat, as illustrated in FIG. 6, in the control circuitry to ensure that the boiler does not over-heat should a control failure occur and should insufficient water be supplied to keep the temperature below a maximum limit, such as 250° F.

Figure 1:
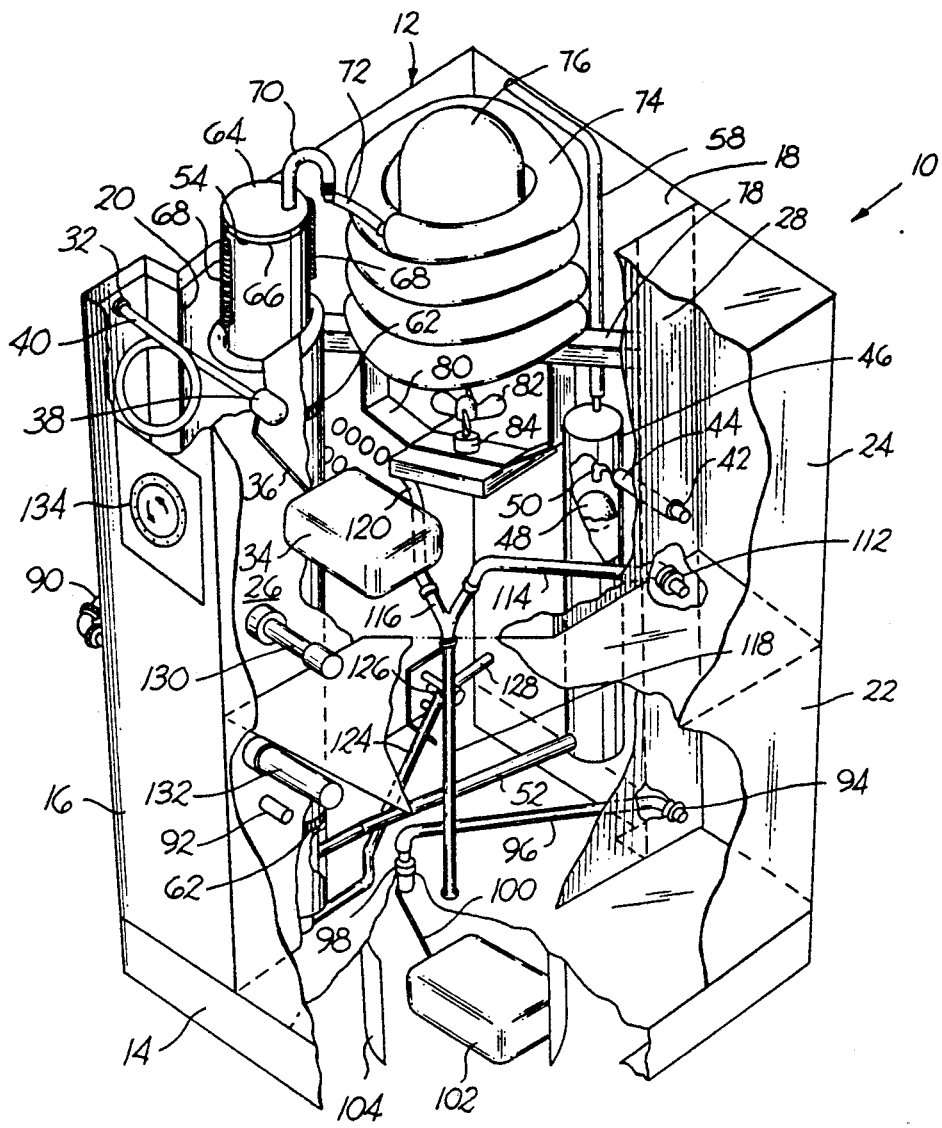
FIG. 1 is a front perspective view of water distillation and purification apparatus constructed in accordance with the principles of the present invention with portions thereof broken away.
Figure 6:
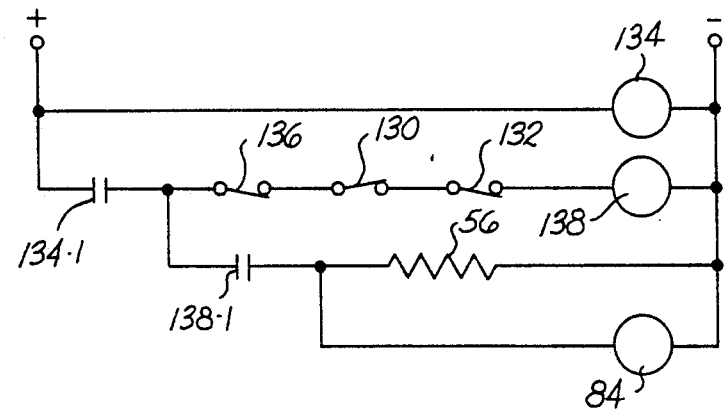
FIG. 6 is a schematic view illustrating the electrical control circuitry of the apparatus of FIG. 1.

The operation of the boiler is controlled by the circuit illustrated in FIG. 6. As aforesaid the water level in the feedwater tank 24 must be above the level float switch 130 and the water level in the distillate tank 22 must be below the level float switch 132 for the boiler heating coil 56 to be energized. Additionally the timer 134 must be energized and the thermostat 136 must be closed, i.e., the temperature in the boiler must be below the preselected shut-off temperature. With these conditions satisfied, the normally opened contacts 134-1 of the timer will close to energize the coil of a relay 138 mounted in series with the thermostat 136 and the switches 130, 132. Energizing the relay closes its normally open contacts 138-1 to energize both the heater coil 56 and the fan motor 84 which together are connected in series with the contacts 138-1. If the timer is not energized, its contacts 134-1 remain open so that the relay cannot be energized and neither can the heater and fan. Opening of either of the switches 130, 132 or an over temperature condition opening the thermostat contacts also precludes energizing the relay 138 and thus the heating coil and fan.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Water purification apparatus positionable upon an existing water dispenser having an open top water reservoir, said apparatus comprising a housing including a base at the bottom of said housing, a feedwater tank for receiving water to be purified, a boiler having an electrical heating element disposed therein for boiling water, conduit means for communicating said feedwater tank to said boiler, means for mounting said tank relative to said conduit means and said boiler such that when water within said tank is above a predetermined level said heating element is submerged in water in said boiler, a condenser for receiving steam from said boiler and for condensing said steam to form distilled water, a distillate tank, means communicating said condenser with said distillate tank for supplying distilled water to said distillate tank, said distillate tank having an outlet for egress of distilled water, a port opening downwardly through said base, means communicating said outlet with said port, float valve means including a valve disposed for opening and closing communication between said port and said outlet, and said valve means including a float for controlling said valve disposed below said base for receipt within said water reservoir for opening and closing said valve in response to water within said reservoir when said apparatus is positioned upon said dispenser.

2. Water purification apparatus as recited in claim 1, wherein said means communicating said condenser with said distillate tank comprises activated carbon filter means.

3. Water purification apparatus as recited in claim 1, including a first level float switch disposed in said feedwater tank for providing a first signal when the water in said feedwater tank is below a predetermined level, a second level float switch in said distillate tank for providing a second signal when the water within said distillate tank is above a predetermined level, and electrical circuit means including said first and second switches for shutting flow of electrical current to said heating element when said first signal is provided by said first switch or said second signal is provided by said second switch.

4. Water purification apparatus as recited in claim 3, wherein said circuit means includes an electrical timer for activating said circuit only during selected times so that said heater can operate only during said times.

5. Water purification apparatus comprising a housing including a feedwater tank for receiving water to be purified, a boiler having an electrical heating element disposed therein for boiling water, means for mounting said feedwater tank at a vertical disposition above said heating element, conduit means communicating said tank with said boiler, said conduit means having an inlet communicating with said tank and an outlet communicating with said boiler at a vertical elevation below said inlet, a check valve disposed within said conduit for closing said inlet against flow of water from said boiler while permitting water to flow from said tank to said boiler, and a vent line connected to said conduit and having an outlet at an elevation above said tank for venting gases within said conduit to atmosphere.

6. Water purification apparatus as recited in claim 5, including a condenser for receiving steam from said boiler and for condensing said steam to form distilled water, a distillate tank, and means for communicating said condenser with said distillate tank.

7. Water purification apparatus as recited in claim 6, wherein said means communicating said condenser with said distillate tank comprises activated carbon filter means.

8. Water purification apparatus as recited in claim 6, including a first level float switch disposed in said feedwater tank for providing a first signal when the water in said feedwater tank is below a predetermined level, a second level float switch in said distillate tank for providing a second signal when the water within said distillate tank is above a predetermined level, and electrical circuit means including said first and second switches for shutting flow of electrical current to said heating element when said first signal is provided by said first switch or said second signal is provided by said second switch.

9. Water purification apparatus as recited in claim 8, wherein said circuit means includes an electrical timer for activating said circuit only during selected times so that said heater can operate only during said times.

10. Water purification apparatus as recited in claim 5, wherein said conduit means comprises a cylindrical housing, means for providing said inlet at the top of said housing, and said check valve comprising a ball for floating on water disposed within said housing, said ball having a diameter slightly smaller than that of said housing so that when sufficient water is within said housing said ball will rise to engage said inlet.

11. Water purification apparatus positionable upon an existing water dispenser having an open top water reservoir, said apparatus comprising a housing including a base at the bottom of said housing, a feedwater tank for receiving water to be purified, a boiler having an electrical heating element disposed therein for boiling water, conduit means for communicating said feedwater tank to said boiler, means for mounting said tank relative to said conduit means and said boiler such that when water within said tank is above a predetermined level said heating element is submerged in water in said boiler, said conduit means having an inlet communicating with said tank and an outlet communicating with said boiler at a vertical elevation below said inlet, a check valve disposed within said conduit for closing said inlet against flow of water from said boiler while permitting water to flow from said tank to said boiler, a vent line connected to said conduit and having an outlet at an elevation above said tank for venting gases within said conduit to atmosphere, a condenser for receiving steam from said boiler and for condensing said steam to form distilled water, a distillate tank, means communicating said condenser with said distillate tank for supplying distilled water to said distillate tank, said distillate tank having an outlet for egress of distilled water, a port opening downwardly through said base, means communicating said outlet with said port, float valve means including a valve disposed for opening and closing communication between said port and said outlet, and said valve means including a float for controlling said valve disposed below said base for receipt within said water reservoir for opening and closing said valve in response to water within said reservoir when said apparatus is positioned upon said dispenser.

12. Water purification apparatus as recited in claim 11, wherein said means communicating said condenser with said distillate tank comprises activated carbon filter means.

13. Water purification apparatus as recited in claim 11, including a first level float switch disposed in said feedwater tank for providing a first signal when the water in said feedwater tank is below a predetermined level, a second level float switch in said distillate tank for providing a second signal when the water within said distillate tank is above a predetermined level, and electrical circuit means including said first and second switches for shutting flow of electrical current to said heating element when said first signal is provided by said first switch or said second signal is provided by said second switch.

14. Water purification apparatus as recited in claim 13, wherein said circuit means includes an electrical timer for activating said circuit only during selected times so that said heater can operate only during said times.

15. Water purification apparatus as recited in claim 11, wherein said conduit means comprises a cylindrical housing, means for providing said inlet at the top of said housing, and said check valve comprising a ball for floating on water disposed within said housing, said ball having a diameter slightly smaller than that of said housing so that when sufficient water is within said housing said ball will rise to engage said inlet.

* * * * *